(12) United States Patent
Marston

(10) Patent No.: US 9,569,388 B2
(45) Date of Patent: Feb. 14, 2017

(54) COMBO ID DETECTION

(71) Applicant: Fairchild Semiconductor Corporation, San Jose, CA (US)

(72) Inventor: Bert Marston, South Portland, ME (US)

(73) Assignee: FAIRCHILD SEMICONDUCTOR CORPORATION, San Jose, CA (US)

( * ) Notice: Subject to any disclaimer, the term of this patent is extended or adjusted under 35 U.S.C. 154(b) by 41 days.

(21) Appl. No.: 14/086,628

(22) Filed: Nov. 21, 2013

(65) Prior Publication Data

US 2014/0143448 A1    May 22, 2014

Related U.S. Application Data

(60) Provisional application No. 61/729,165, filed on Nov. 21, 2012.

(51) Int. Cl.

| | |
|---|---|
| *G06F 3/00* | (2006.01) |
| *G06F 5/00* | (2006.01) |
| *G06F 13/24* | (2006.01) |
| *G06F 13/32* | (2006.01) |
| *G06F 13/38* | (2006.01) |
| *G06F 17/30* | (2006.01) |
| *G06F 3/12* | (2006.01) |
| *G06F 11/00* | (2006.01) |

(52) U.S. Cl.
CPC ....... *G06F 13/382* (2013.01); *G06F 17/30725* (2013.01); *G06F 3/1231* (2013.01); *G06F 11/006* (2013.01); *G06F 2213/0042* (2013.01)

(58) Field of Classification Search
CPC ........ G06F 3/15; G06F 3/0304; G06F 3/0338; G06F 11/006; G06F 17/30725
USPC ................... 710/3, 9, 50, 268, 269
See application file for complete search history.

(56) References Cited

U.S. PATENT DOCUMENTS

| | | | | |
|---|---|---|---|---|
| 5,987,548 | A * | 11/1999 | Dixon | G06F 13/4068 710/104 |
| 6,076,160 | A * | 6/2000 | Wisor | G06F 13/4217 710/104 |
| 7,058,732 | B1 * | 6/2006 | Hauck | G06F 13/4243 710/15 |
| 7,576,559 | B2 * | 8/2009 | Song | G06F 13/4072 326/30 |
| 8,179,151 | B2 | 5/2012 | Jasa et al. | |

(Continued)

FOREIGN PATENT DOCUMENTS

| | | |
|---|---|---|
| CN | 101004729 A | 7/2007 |
| CN | 201628954 U | 11/2010 |

(Continued)

OTHER PUBLICATIONS

"Chinese Application Serial No. 201320744248.X, Office Action mailed Mar. 25, 2014", w/English Translation, 2 pgs.

(Continued)

*Primary Examiner* — Idriss N Alrobaye
*Assistant Examiner* — Getente A Yimer
(74) *Attorney, Agent, or Firm* — Schwegman Lundberg & Woessner, P.A.

(57) ABSTRACT

This document discusses, among other things, an identification (ID) detection module configured to identify a first ID code in a first detect period within a first attach period and to identify a second ID code in a second detect period within the first attach period.

20 Claims, 3 Drawing Sheets

(56) References Cited

U.S. PATENT DOCUMENTS

| | | | | |
|---|---|---|---|---|
| 8,924,621 | B2* | 12/2014 | Jadus | G06F 13/4004 710/11 |
| 2005/0268000 | A1* | 12/2005 | Carlson | G06F 13/4081 710/15 |
| 2007/0230334 | A1* | 10/2007 | Yamada | G06F 13/4286 370/218 |
| 2009/0109639 | A1* | 4/2009 | Li | H04M 1/72527 361/748 |
| 2010/0299462 | A1* | 11/2010 | Yen | G06F 13/4291 710/61 |
| 2012/0198101 | A1* | 8/2012 | Porcella | G06F 13/4081 710/12 |
| 2013/0031275 | A1* | 1/2013 | Hanes | G06F 3/0231 710/4 |

FOREIGN PATENT DOCUMENTS

| | | |
|---|---|---|
| CN | 102047129 A | 5/2011 |
| CN | 102216918 A | 10/2011 |
| CN | 102591826 A | 7/2012 |
| CN | 102684270 A | 9/2012 |
| CN | 103837745 A | 6/2014 |
| CN | 203981781 U | 12/2014 |

OTHER PUBLICATIONS

"Chinese Application Serial No. 201320744248.X, Office Action mailed May 22, 2014", w/English Translation, 3 pgs.

"Chinese Application Serial No. 201320744248.X, Response filed Apr. 15, 2014 to Office Action mailed Mar. 25, 2014", w/English Claims, 9 pgs.

"Chinese Application Serial No. 201320744248.X, Response filed Aug. 6, 2014 to Office Action mailed May 22, 2014", w/English Claims, 12 pgs.

"Chinese Application Serial No. 201310594229.8, Office Action mailed Nov. 23, 2015", w/ English Translation, 7 pgs.

"Chinese Application Serial No. 201310594229.8, Response filed Apr. 8, 2016 to Office Action mailed Nov. 23, 2015", w/ English Claims, 16 pgs.

* cited by examiner

COMBO ID DETECTION

CLAIM OF PRIORITY

This application claims the benefit of priority under 35 U.S.C. §119(e) of U.S. Provisional Patent Application Ser. No. 61/729,165, titled "V3 COMBO ID IMPLEMENTATION," filed on Nov. 21, 2012, which is incorporated by reference herein in its entirety.

BACKGROUND

A universal serial bus (USB) switch can enable multiple accessories to utilize a single USB port on an electronic device (e.g., a mobile communication device, a portable media player, etc.). In certain examples, the type of accessory connected to the USB switch can be identified by detecting a resistance of the accessory. Traditional USB identification (ID) detection can determine an ID resistance in approximately 200 ms, with 1 nF of load capacitance. However, the number of resistance values that can be checked in a given time period (e.g., 200 ms, etc.) can be limited.

OVERVIEW

This document discusses, among other things, ID detection systems and methods configured to determine an ID resistance, for example, on a USB accessory detection line (ID_CON), in less than 25 ms. Further, more than one ID resistance can be determined (e.g., three or more unique ID resistances) from a single accessory or multiple accessories, each in approximately 25 ms or less, supported by a float time (e.g., 15 ms, etc.) between valid ID resistance determinations. The ID detection systems and methods disclosed herein can determine a larger number of ID resistance values than traditional ID detection, faster than traditional ID detection, without sacrificing accuracy.

This section is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
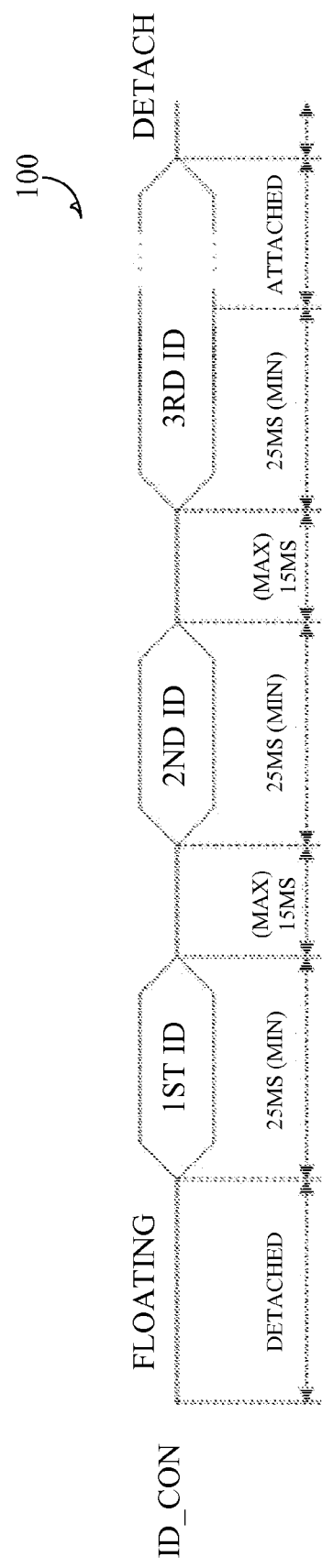
FIG. 1 illustrates generally an example detection timing diagram on a USB accessory detection line (ID_CON).

A comparator can be used to detect the value of an ID resistor on an accessory device, such as disclosed in the Jasa et al. U.S. Pat. No. 8,179,151, titled "METHOD AND SYSTEM THAT DETERMINES THE VALUE OF A RESISTOR IN LINEAR AND NON-LINEAR RESISTOR SETS," assigned to Fairchild Semiconductor Corporation and incorporated herein in its entirety. A known current can be applied to the ID resistor, and the resulting voltage can be compared to first and second thresholds of a window comparator. In an example, the window comparator can include a first comparator configured to compare the resulting voltage to a lower threshold (WINBOT) and a second comparator configured to compare the resulting voltage to an upper threshold (e.g., WINTOP). In an example, the lower and upper thresholds can include values of 1.85V and 2.15V, respectively, about a desired voltage of 2V. In other examples, other voltages can be used.

Traditional USB detection schemes support a limited number of resistance values. For example, a traditional Micro-USB switch (MUS) ID detection scheme can support 32 unique ID resistance values, ranging from 2 k ohms to 1M ohms. However, identifying each of these 32 unique ID resistance values can take up to 200 ms.

This document discusses, among other things, ID detection systems and methods configured to determine an ID resistance, for example, on a USB accessory detection line (ID_CON), in less than 25 ms. Further, more than one ID resistance can be determined (e.g., three or more unique ID resistances) from a single accessory or multiple accessories, each in approximately 25 ms or less, supported by a float time (e.g., 15 ms, etc.) between valid ID resistance determinations, still with a maximum load capacitance of 1 nF. The ID detection systems and methods disclosed herein can determine a larger number of ID resistance values than traditional ID detection, faster than traditional ID detection, without sacrificing accuracy.

To determine an ID resistance within 25 ms, the number of resistances supported can be limited, for example, from 32 ID resistance values ranging from 2 k ohms to 1M ohms down to 23 ID resistance values from 2 k ohms to 200 k ohms. In other examples, other ID resistances can be supported in other time periods (e.g., less ID resistance values in a shorter time period, more ID resistance values in a longer time period, etc.). Detecting this reduced set of supported ID resistance values can be referred to as "combo ID detection."

In operation, traditional ID detection begins at the highest resistance (e.g., 1M ohms) and works down to the lowest resistance until the correct value is determined. Further, in traditional ID detection, the RC charge time for each current associated with each resistance value is determined as a worst case scenario for all current values. In contrast, because higher resistance values (associated with lower current values) require more RC charge time between checks, the ID detection systems and methods disclosed herein can begin detection at a lower resistance value to minimize required RC charge time (e.g., beginning at 200 k ohms instead of 1M ohms, and checking down to 2 k ohms). Further, the ID detection systems and methods disclosed herein can provide unique RC charge times tailored for each respective digital-to-analog-converter (DAC) value (e.g., a 1000 uA DAC current requires less RC charge time than a 10 uA DAC current, etc.).

To find multiple MUS ID detection resistance values within a given attach period, the traditional MUS "raw mode" approach can be applied to the initial attach. The "raw mode" can keep the analog-to-digital (ADC) always on and can identify changes in the ID resistance, immediately informing a baseband or other circuit or processor that the ID resistance has changed. The ID detection systems and methods disclosed herein can be placed in a mode similar to "raw mode" on initial attach, where the ADC can stay on looking for changes in the ID resistance. Here, each changed value can be stored in a register (e.g., adc_cmbX) based on the order in which it is identified. For example: adc_cmb1=first ID resistance; adc_cmb2=second ID resistance; etc.

An ADC attach timer can be implemented to tell the state machine when it can stop looking for values. In an example, the default value can be chosen as 150 ms to support the worst case timing for 3 ID resistance values. The timer can be programmable to support all possible ID resistance values, for example, up to six or more unique ID resistance values. With full support, the minimum timing requirement can be increased to accommodate additional or all possible values, in certain examples increasing the time beyond 200 ms, up to 300 ms or more, providing flexibility for future requirements.

Float times between valid ID resistance detections can be supported without falsely identifying a detachment. The ADC state machine can go to whatever DAC value provides an ID resistance detection voltage within the bounds of a window comparator (e.g., ~1.85V to ~2.15V). If the ID resistance detection voltage is below the window, the current can be increased. If the ID resistance detection voltage is above the window, the current can be decreased.

When a float condition occurs, the ADC state machine can reduce the DAC current. If the float condition persists, the smallest DAC current (e.g., ~1.5 uA) can be provided, though taking a significant time to determine the value (e.g., ~50 ms). In combo ID detection, if a float occurs for 15 ms, a state machine (e.g., a circuit or processor, etc.) can spend that 15 ms going smaller in DAC currents. Depending on which ID resistance value is seen before the float, the 15 ms may place the state machine outside of the combo ID region.

If the state machine ends up outside the combo ID region, it can take time to get back within the region, which can hurt the ability to meet the 25 ms time to find the valid ID resistance value. To alleviate the detection moving outside the combo ID region, a halt counter can be implemented. The halt counter can halt the detection moving outside of the combo id region (e.g., >200 k ohms). The default time can be 10 ms. The halt counter can prevent detection from getting too far outside of the combo ID region such that it would not be able to come back in time to find the new valid region within the time constraints.

FIG. 1 illustrates generally an example detection timing diagram 100 on a USB accessory detection line (ID_CON) 101 including first, second, and third ID detections 102, 104, 106 and float times 103, 105 between the ID detections. In an example, upon attach, a first ID detection 102 occurs in a first 25 ms detection period, followed by a first float 103 in a first 15 ms float period. Following the first float 103, a second ID detection 104 can occur in a second 25 ms detection period, followed by a second float 105 in a second 15 ms time period. Following the second float, a third ID detection 106 can occur in a third 25 ms detection period. In other examples, the detection and float periods can include one or more other time values, and the example detection timing diagram 100 can include more or less ID detections, as desired.

In an example, the first, second, and third ID detections 102, 104, 106 can include ID detection from separate first, second, and third accessories connected to a USB port of a device performing said ID detections. In other examples, two or more ID detections can be made from a single accessory, for example, to provide a greater number of unique ID values. For example, the traditional USB detection scheme can support 32 unique ID resistance values. In contrast, using the ID detection systems and methods described herein, a single accessory can be configured to provide multiple resistance values to the device performing the ID detection.

For example, upon attach (e.g., or a specified time after attach), the accessory can be configured to provide a first ID resistance. After a defined time period (or the occurrence of one or more other events), the accessory can be configured to provide a second ID resistance. The combination of these two ID resistance values can provide a positional numeral system with a base equal to the number of supported ID resistance values. Thus, for 23 supported ID resistance values, the positional numeral system, providing 2 resistance values, can provide (23×23)=529 unique ID combinations (first ID resistance, second ID resistance). In other examples, more resistance values can be provided, further expanding the number of unique ID combinations. For example, for 23 supported ID resistance values, the positional numeral system, providing 3 resistance values, can provide 23×23×23= 12167 unique ID combinations (first ID resistance, second ID resistance, third ID resistance).

In an example, a first accessory can provide first and second ID resistance values. In an example, the first and second ID resistance values can include the same value (e.g., 200 k ohms and 200 k ohms, respectively), but associated with different detect periods within a first attach period. In other examples, the first and second ID resistance values can include different values (e.g., 200 k ohms and 3.2 k ohms, respectively), again, associated with different detect periods within a first attach period.

In other examples, a first accessory device can provide a first ID (e.g., including one or more ID resistance values) and a second accessory device can provide a second ID (e.g., including one or more ID resistance values).

Figure 2:
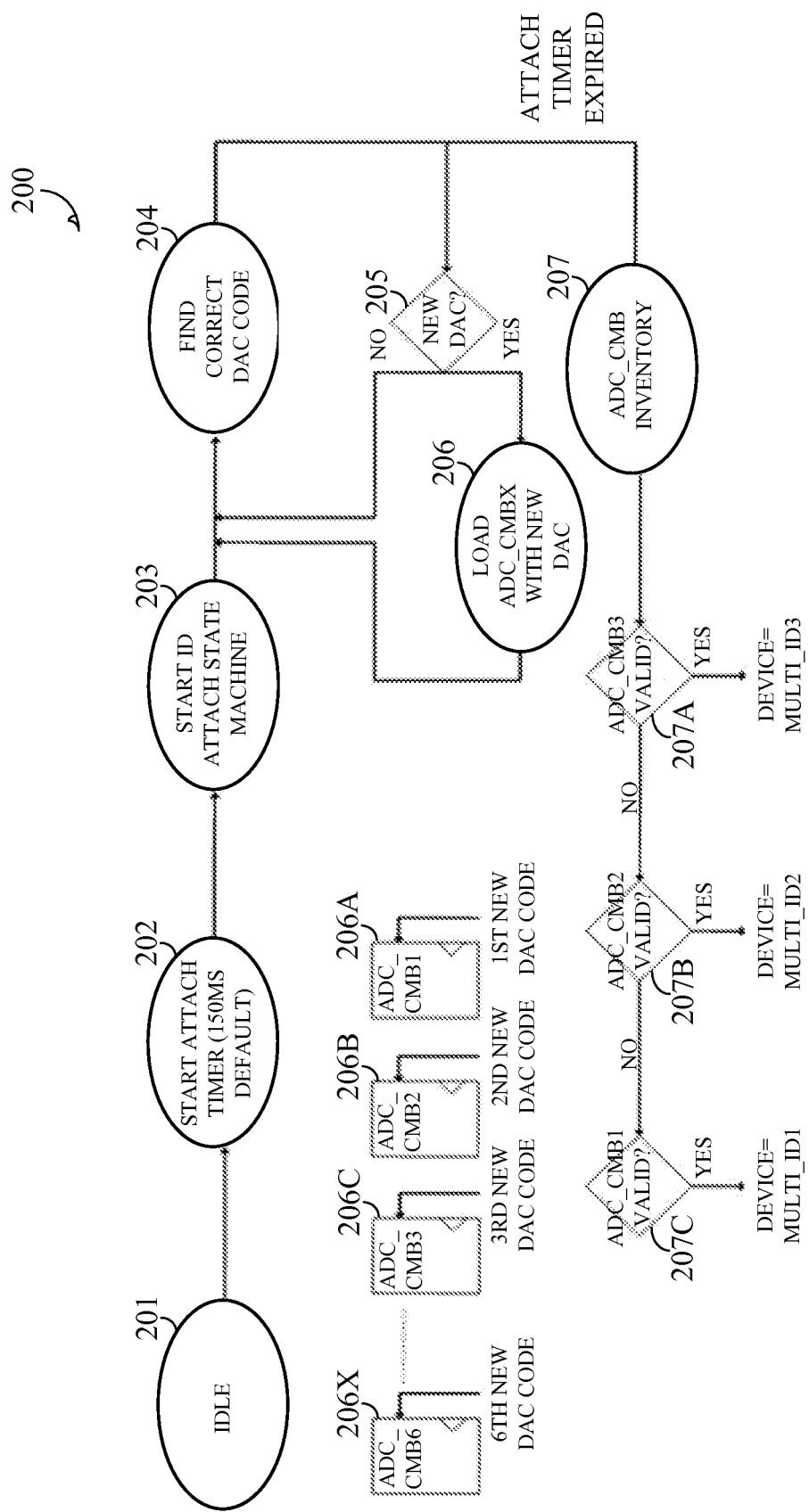
FIG. 2 illustrates generally an example ID detection state diagram for the systems and methods disclosed herein.

FIG. 2 illustrates generally an example ID detection state diagram 200 for the ID detection systems and methods disclosed herein. At 201, the system is at idle. At 202, an attach timer begins. In an example, the attach timer can be programmable, having a default value of 150 ms. In other examples, other default values can be used. At 203, an ID attach state machine is started. At 204, a DAC code is detected. In an example, when a DAC code is detected, it can be verified with three consecutive detections to ensure detection accuracy. At 205, if the DAC code is new, at 206, the new DAC code is stored in a register and process returns to 204. In an example, the system can include multiple registers 206A, 206B, 206C, 206X configured to receive new DAC codes (e.g., from 206). At 205, if the DAC code is not new, process returns to 204. When the attach timer expires, the DAC codes stored in the one or more registers are inventoried at 207, including validating that each register has received a new DAC code (e.g., determine if a value is stored at 207A, 207B, 207C).

Figure 3:
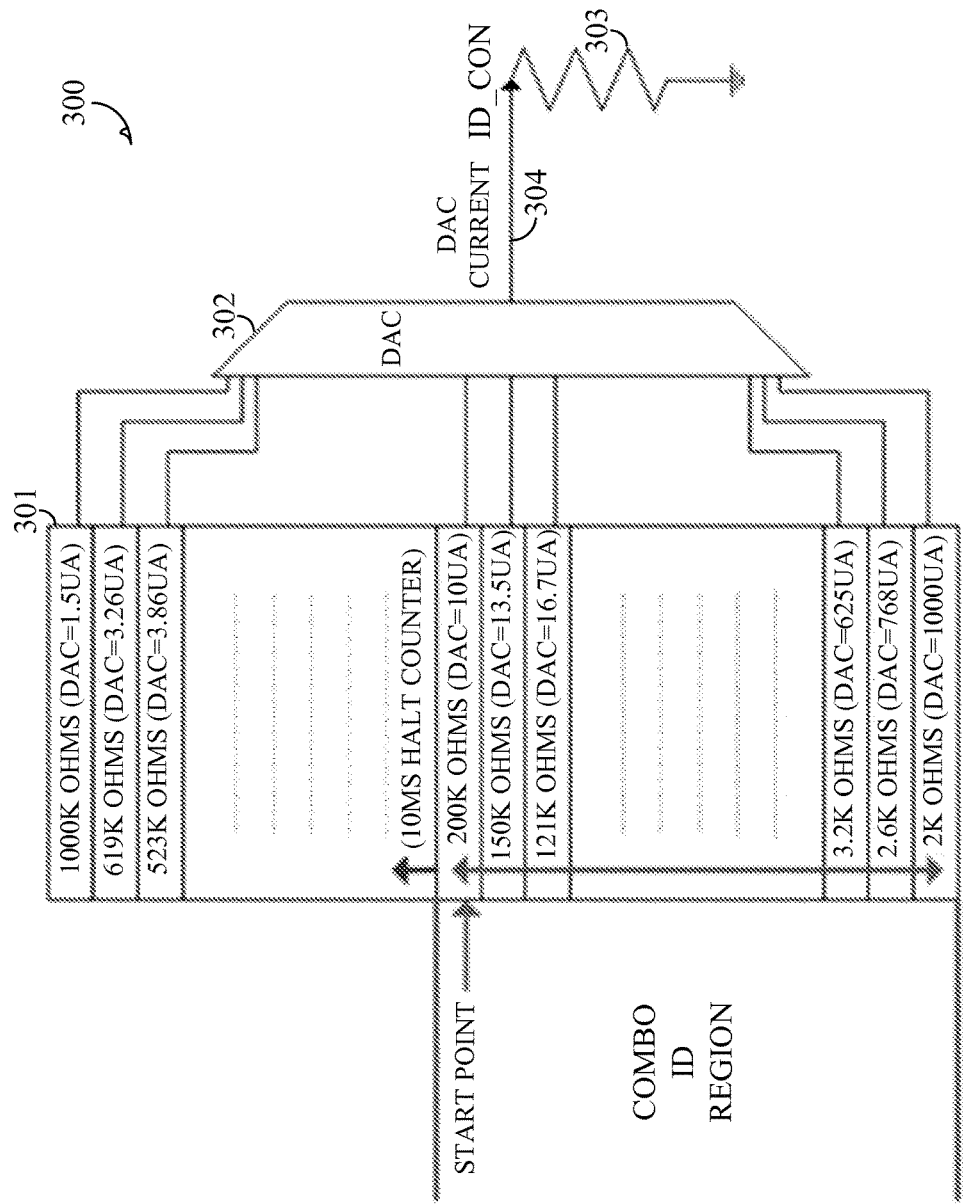
FIG. 3 illustrates generally an example system configured to determine an ID resistance on an accessory detection line (ID_CON).

FIG. 3 illustrates generally an example ID detection system 300, including a controller 301 and a digital-to-analog converter (DAC) 302 configured to provide a DAC current. The ID detection system 300 configured to determine an ID resistance 303 coupled to an accessory detection line (ID_CON) 304 using a voltage on the ID_CON 304 developed across the ID resistance 303. In an example, the voltage on the ID_CON 304 can be detected using a comparator (e.g., a window comparator, etc.). In an example, the ID resistance value can be checked continually for changes until an attach timer expires. Each new detected ID resistance value can be stored in a register (e.g., one or more adc_cmb registers), such as those illustrated in FIG. 2.

Multiple ID resistance values can be found in a given attach time. Further, to support "fast as possible" detection, each of the DAC current can be given a unique RC settle time value, for example, because higher current requires less settle time for detection.

The ID detection systems and methods disclosed herein can include Micro-USB switch (MUS) ID detection, or one or more other type of ID detection.

Additional Notes

In Example 1, an identification (ID) detection module can include a controller configured to identify a first ID code in a first detect period within a first attach period and to identify a second ID code in a second detect period within the first attach period.

In Example 2, the controller of Example 1 is optionally configured to receive an indication that an accessory has been coupled to the detection module and to start a first attach timer in response to the received indication, wherein the first attach period optionally expires at the end of the first attach timer.

In Example 3, any one or more of Examples 1-2 can optionally include first and second registers, wherein the controller of any one or more of Examples 1-2 is optionally configured to store the first identified ID code in the first register and to store the second identified ID code in the second register.

In Example 4, the controller of any one or more of Examples 1-3 is optionally configured to store a plurality of ID current values and to control an output current of a source configured to provide an output current to an accessory detection input, wherein the output current of any one or more of Examples 1-3 is optionally one of the plurality of ID current values, wherein the detection module of any one or more of Examples 1-3 is optionally configured to receive a voltage in response to the output current and to compare the received voltage to first and second thresholds, and wherein the controller of any one or more of Examples 1-3 is optionally configured to identify the first ID code when the received voltage is between the first and second thresholds during the first detect period within the first attach period, identify the second ID code when the received voltage is between the first and second thresholds during the second detect period within the first attach period.

In Example 5, the first and second ID codes of any one or more of Examples 1-4 are optionally associated with a first attachment of a first accessory device, and the first ID code of any one or more of Examples 1-4 is optionally different than the second ID code.

In Example 6, the controller of any one or more of Examples 1-5 is optionally configured to identify a third ID code in a third detect period within the first attach period, and the combination of the first, second, and third ID codes of any one or more of Examples 1-5 optionally identify a first accessory device.

In Example 7, an identification (ID) detection system includes a source configured to provide an output current to an accessory detection input, wherein the output current is one of a plurality of identification (ID) current values, and a detection module configured to receive a voltage in response to the output current and to compare the received voltage to first and second thresholds, wherein the detection module includes a controller configured to store the plurality of ID current values, to control the output current of the source using information from the detection module, to identify a first ID code when the received voltage is between the first and second thresholds during a first detect period within a first attach period, and to identify a second ID code when the received voltage is between the first and second thresholds during a second detect period within the first attach period.

In Example 8, each of the plurality of ID current values of any one or more of Examples 107 optionally has a unique charge time, wherein a larger ID current value has a smaller unique charge time than a smaller ID current value.

In Example 9, an identification (ID) detection method includes identifying a first ID code in a first detect period within a first attach period and identifying a second ID code in a second detect period within the first attach period.

In Example 10, any one or more of Examples 1-9 optionally includes storing a plurality of ID current values using a detection module, providing an output current to an accessory detection input using a source, wherein the output current is one of the plurality of identification (ID) current values, receiving a voltage in response to the output current at a detection module, comparing, using the detection module, the received voltage to first and second thresholds, controlling, using the detection module, the output current of the source using information from the comparing, wherein the identifying the first ID code of any one or more of Examples 1-9 optionally includes identifying the ID current value that provides a received voltage between the first and second thresholds during the first detect period within the first attach period, and wherein the identifying the second ID code of any one or more of Examples 1-9 optionally includes identifying the ID current value that provides a received voltage between the first and second thresholds during the second detect period within the first attach period.

In Example 11, a system or apparatus can include, or can optionally be combined with any portion or combination of any portions of any one or more of Examples 1-10 to include, means for performing any one or more of the functions of Examples 1-10, or a machine-readable medium including instructions that, when performed by a machine, cause the machine to perform any one or more of the functions of Examples 1-10.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplates examples in which only those elements shown or described are provided. Moreover, the present inventor also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document, for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

What is claimed is:

1. An identification (ID) detection system configured to identify multiple ID codes on a USB accessory detection line from a single accessory device in a first attach period, the ID detection system comprising:
   a controller configured to, upon attach of an accessory device to a USB detection line:
      identify a first ID code on the USB detection line from the accessory device in a first detect period within the first attach period using a set of ID detection current values; and
      identify a second ID code on the USB detection line from the accessory device in a second detect period within the first attach period using the set of ID detection current values,
   wherein the first attach period includes the first detect period, a first float time, and the second detect period.

2. The ID detection system of claim 1, wherein the controller is configured to receive an indication that the accessory device has been coupled to the detection module and to start a first attach timer in response to the received indication,
   wherein the first attach period expires at the end of the first attach timer, and
   wherein the first detect period is less than or equal to 25 ms.

3. The ID detection system of claim 1, wherein the controller is configured to control an output current of a source configured to provide an output current to the USB detection line, wherein the output current is one of the of ID detection current values,
   wherein the detection system includes
   a comparator configured to receive a voltage in response to the output current and to compare the received voltage to first and second thresholds, and wherein the controller is configured to:
      identify the first ID code when the received voltage is between the first and second thresholds during the first detect period within the first attach period;
      identify the second ID code when the received voltage is between the first and second thresholds during the second detect period within the first attach period.

4. The ID detection system of claim 1, wherein the first and second ID codes are associated with a first attachment of the accessory device, and wherein the first ID code is different than the second ID code.

5. The ID detection system of claim 1, wherein the controller is configured to identify a third ID code on the USB detection line from the accessory device in a third detect period within the first attach period using the set of ID detection current values, and
   wherein the combination of the first, second, and third ID codes identify the accessory device.

6. An identification (ID) detection system configured to identify multiple ID codes on a USB accessory detection line from a single accessory device in a first attach period, the ID detection system, comprising:
   a source configured to provide an output current to an accessory detection input, wherein the output current is one of a set of ID detection current values; and
   a comparator configured to receive a voltage in response to the output current and to compare the received voltage to first and second thresholds;
   a controller configured to, upon attach of an accessory device to a USB detection line:
      control the output current of the source using information from the detection module;
      identify a first ID code on the USB detection line from the accessory device when the received voltage is between the first and second thresholds during a first detect period within a first attach period; and
      identify a second ID code on the USB detection line from the accessory device when the received voltage is between the first and second thresholds during a second detect period within the first attach period,
   wherein the first attach period includes the first detect period, a first float time, and the second detect period.

7. The ID detection system of claim 6, wherein the controller is configured to receive an indication that the accessory device has been coupled to the detection module and to start a first attach timer in response to the received indication,
wherein the first attach period expires at the end of the first attach timer, and
wherein the first detect period is less than or equal to 25 ms.

8. The ID detection system of claim 6, wherein the first and second ID codes are associated with a first attachment of the accessory device, and wherein the first ID code is different than the second ID code.

9. The ID detection system of claim 6, wherein the controller is configured to identify a third ID code on the USB detection line from the accessory device in a third detect period within the first attach period using the set of ID detection current values, and
wherein the combination of the first, second, and third ID codes identify the accessory device.

10. An identification (ID) detection method configured to identify multiple ID codes on a USB accessory detection line from a single accessory device in a first attach period, the ID detection method comprising:
identifying, using a controller, upon attach of an accessory device to a USB detection line, a first ID code on the USB detection line from the accessory device in a first detect period within the first attach period using a set of ID detection current values; and
identifying, using the controller, a second ID code on the USB detection line from the accessory device in a second detect period within the first attach period using the set of ID detection current values,
wherein the first attach period includes the first detect period, a first float time, and a second detect period.

11. The ID detection method of claim 10, including:
receiving, at the controller, an indication that the accessory device has been coupled to the detection module; and
starting a first attach timer, using the controller, in response to the received indication,
wherein the first attach period expires at the end of the first attach timer.

12. The ID detection method of claim 10, including:
providing an output current to the USB detection line using a source, wherein the output current is one of the set of ID detection current values;
receiving a voltage in response to the output current at a comparator;
comparing, using the comparator, the received voltage to first and second thresholds;
controlling the output current of the source using information from the comparing,
wherein the identifying the first ID code includes identifying the ID current value that provides a received voltage between the first and second thresholds during the first detect period within the first attach period, and
wherein the identifying the second ID code includes identifying the ID current value that provides a received voltage between the first and second thresholds during the second detect period within the first attach period.

13. The ID detection method of claim 10, wherein the first and second ID codes are associated with a first attachment of the accessory device, and wherein the first ID code is different than the second ID code.

14. The ID detection method of claim 10, including:
identifying, using the controller, a third ID code on the USB detection line from the accessory device in a third detect period within the first attach period using the set of ID detection current values,
wherein the combination of the first, second, and third ID codes identify the accessory device.

15. The ID detection system of claim 1, including:
a digital-to-analog converter (DAC) configured to, upon attach of the accessory device to a USB detection line, provide one of a set of ID detection current values to the USB detection line;
a window comparator configured to compare a voltage on the USB detection line to a voltage window;
wherein, during the first detect period within the first attach period, the DAC is configured to provide a first ID detection current from the set of ID detection current values, the window comparator is configured to compare a resulting voltage on the USB detection line from the first ID detection current to the voltage window, and if the resulting voltage is outside of the voltage window, the DAC is configured to decrement the ID detection current to another ID detection current from the set of ID detection current values, and
wherein, during the second detect period within the first attach period, the DAC is configured to provide the first ID detection current from the set of ID detection current values, the window comparator is configured to compare the resulting voltage on the USB detection line from the first ID detection current to the voltage window, and if the resulting voltage is outside of the voltage window, the DAC is configured to decrement the ID detection current to another ID detection current from the set of ID detection current values.

16. The ID detection system of claim 15, including:
a first register configured to store a first ID code from the first detect period within the first attach period; and
a second register configured to store a second ID code from the second detect period within the first attach period;
wherein the controller is configured to provide:
the first ID code corresponding to an ID detection current from the set of ID detection current values that provides the resulting voltage on the USB detection line within the voltage window during the first detect period to the first register, and
the second ID code corresponding to an ID detection current from the set of ID detection current values that provides the resulting voltage on the USB detection line within the voltage window during the second detect period to the second register.

17. The ID detection system of claim 1, wherein the first and second detect periods are each less than or equal to 25 ms, and
wherein the set of ID detection current values includes a reduced set of ID detection current values, such that the controller can identify each of the first and second ID codes within the respective first and second detect periods.

18. The ID detection system of claim 1, wherein the reduced set of ID detection current values range between 10 and 1000 microamps.

19. The ID detection system of claim 6, wherein the first and second detect periods are each less than or equal to 25 ms, and
wherein the set of ID detection current values includes a reduced set of ID detection current values, such that the controller can identify each of the first and second ID codes within the respective first and second detect periods.

20. The ID detection method of claim 10, wherein the first and second detect periods are each less than or equal to 25 ms,
- wherein the identifying the first ID code using the set of ID detection current values includes using a reduced set of ID detection current values, such that the controller can identify the first ID code within the first detect period, and
- wherein the identifying the second ID code using the set of ID detection current values includes using the reduced set of ID detection current values, such that the controller can identify the second ID code within the second detect period.

* * * * *